(12) United States Patent
Smith et al.

(10) Patent No.: US 8,293,098 B2
(45) Date of Patent: Oct. 23, 2012

(54) INFILTRATION/INFLOW CONTROL FOR MEMBRANE BIOREACTOR

(75) Inventors: George W. Smith, Pewaukee, WI (US); Dennis J. Barnes, Oconomowoc, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 559 days.

(21) Appl. No.: 12/447,084

(22) PCT Filed: Oct. 23, 2007

(86) PCT No.: PCT/US2007/022493
§ 371 (c)(1),
(2), (4) Date: Feb. 5, 2010

(87) PCT Pub. No.: WO2008/051546
PCT Pub. Date: May 2, 2008

(65) Prior Publication Data
US 2010/0191377 A1    Jul. 29, 2010

Related U.S. Application Data

(60) Provisional application No. 60/862,626, filed on Oct. 24, 2006.

(51) Int. Cl.
*B01D 21/24* (2006.01)
(52) U.S. Cl. ....... 210/97; 210/150; 210/151; 210/195.2; 210/196; 210/220; 210/513; 210/532.1; 210/906
(58) Field of Classification Search ............ 210/97, 210/150–151, 195.2, 196, 220, 513, 532.1, 210/90
See application file for complete search history.

(56) References Cited

U.S. PATENT DOCUMENTS

| | | | |
|---|---|---|---|
| 256,008 | A | 4/1882 | Leak |
| 285,321 | A | 9/1883 | Tams |
| 511,995 | A | 1/1894 | Buckley |
| 1,997,074 | A | 4/1935 | Novotny |
| 2,080,783 | A | 5/1937 | Petersen |

(Continued)

FOREIGN PATENT DOCUMENTS

AU    34400/84 A    4/1985

(Continued)

OTHER PUBLICATIONS

"Chemical Cleaning Definition", Lenntech BV, Lenntech Water treatment & purification Holding B.V., Chemical Cleaning.

(Continued)

*Primary Examiner* — Chester Barry

(57) ABSTRACT

A wastewater treatment system comprising: a first treatment zone (11) fluidly connected to one or more further treatment zones (12-14), a membrane module (16) comprising a filter membrane is positioned in or fluidly connected to the further treatment zone; and a gravity settling device (15) fluidly connected to the first treatment zone (11) to receive overflow therefrom. A method of treating wastewater comprising flowing wastewater through one or more treatment zones (11-14) to produce a fluid product which is passed through a filter membrane (16) to produce a concentrated mixed liquor and a filtrate; returning at least a portion of the concentrated mixed liquor to at least one of the treatment zones (11); when the flow of wastewater water exceeds a predetermined level, flowing a portion of the returned mixed liquor to a gravity settling device (15) and clarifying the mixed liquor within the gravity settling device (15).

20 Claims, 2 Drawing Sheets

U.S. PATENT DOCUMENTS

| | | |
|---|---|---|
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Jacob Shorr |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A * | 6/1981 | Pollock .................... 210/621 |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |

| | | |
|---|---|---|
| 4,968,430 A | 11/1990 | Hildenbrand et al. |
| 4,968,733 A | 11/1990 | Muller et al. |
| 4,969,997 A | 11/1990 | Kluver et al. |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. ............... 210/614 |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A * | 9/1998 | Bower et al. ............... 210/770 |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman ............... 210/606 |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |

| | | |
|---|---|---|
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. ............ 210/601 |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 * | 8/2008 | Devine ............ 210/605 |
| 7,455,765 B2 | 11/2008 | Elefritz et al. |
| 7,481,933 B2 | 1/2009 | Barnes |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 * | 1/2010 | Probst ............ 210/620 |
| 7,662,212 B2 | 2/2010 | Mullette et al. |
| 7,708,887 B2 | 5/2010 | Johnson et al. |

| | | |
|---|---|---|
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0185447 A1 | 12/2002 | Blount ............................ 210/742 |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0111412 A1 | 6/2003 | Jeong et al. .................... 210/605 |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0000517 A1 | 1/2004 | Austin et al. ................... 210/602 |
| 2004/0007523 A1 | 1/2004 | Gabon et al. ................... 210/605 |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0091602 A1 | 4/2012 | Cumin et al. |

FOREIGN PATENT DOCUMENTS

| | | |
|---|---|---|
| AU | 55847/86 A | 9/1986 |
| AU | 77066/87 A | 2/1988 |
| AU | 762091 B2 | 6/2003 |
| CA | 2531764 A1 | 3/2005 |
| CN | 1050770 | 1/1995 |
| CN | 2204898 Y | 8/1995 |
| CN | 2236049 Y | 9/1996 |
| CN | 1159769 A | 9/1997 |
| CN | 1249698 A | 4/2000 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |

| | | | | | | |
|---|---|---|---|---|---|---|
| DE | 29906389 | U1 | 6/1999 | JP | 62140607 A | 6/1987 |
| DE | 10209170 | C1 | 8/2003 | JP | 62144708 A | 6/1987 |
| EP | 012557 | B1 | 2/1983 | JP | 62163708 A | 7/1987 |
| EP | 126714 | A2 | 11/1984 | JP | 62179540 A | 8/1987 |
| EP | 050447 | B1 | 10/1985 | JP | 62237908 A | 10/1987 |
| EP | 194735 | A2 | 9/1986 | JP | 62250908 A | 10/1987 |
| EP | 250337 | A1 | 12/1987 | JP | 62187606 | 11/1987 |
| EP | 327025 | A1 | 8/1989 | JP | 62262710 A | 11/1987 |
| EP | 344633 | A1 | 12/1989 | JP | 63097634 A | 4/1988 |
| EP | 090383 | B1 | 5/1990 | JP | 63099246 A | 4/1988 |
| EP | 407900 | A2 | 1/1991 | JP | 63143905 A | 6/1988 |
| EP | 463627 | A2 | 1/1992 | JP | 63171607 A | 7/1988 |
| EP | 0464321 | A1 | 1/1992 | JP | 63180254 A | 7/1988 |
| EP | 492942 | A2 | 7/1992 | JP | S63-38884 | 10/1988 |
| EP | 518250 | B1 | 12/1992 | JP | 64-075542 A | 3/1989 |
| EP | 547575 | A1 | 6/1993 | JP | 1-501046 T | 4/1989 |
| EP | 280052 | B1 | 7/1994 | JP | 1111494 | 4/1989 |
| EP | 395133 | B1 | 2/1995 | JP | 01151906 A | 6/1989 |
| EP | 662341 | A1 | 7/1995 | JP | 01-307409 A | 12/1989 |
| EP | 492446 | B1 | 11/1995 | JP | 02-017925 | 1/1990 |
| EP | 430082 | B1 | 6/1996 | JP | 02017924 | 1/1990 |
| EP | 734758 | A1 | 10/1996 | JP | 02026625 A | 1/1990 |
| EP | 763758 | A1 | 3/1997 | JP | 02031200 A | 2/1990 |
| EP | 824956 | A2 | 2/1998 | JP | 02040296 A | 2/1990 |
| EP | 848194 | A2 | 6/1998 | JP | 02107318 A | 4/1990 |
| EP | 855214 | A1 | 7/1998 | JP | 02126922 A | 5/1990 |
| EP | 627255 | B1 | 1/1999 | JP | 02144132 A | 6/1990 |
| EP | 911073 | A1 | 4/1999 | JP | 02164423 A | 6/1990 |
| EP | 920904 | A2 | 6/1999 | JP | 02174918 A | 7/1990 |
| EP | 1034835 | A1 | 9/2000 | JP | 02241523 A | 9/1990 |
| EP | 1052012 | A1 | 11/2000 | JP | 02277528 A | 11/1990 |
| EP | 1156015 | A1 | 11/2001 | JP | 02284035 A | 11/1990 |
| EP | 1300186 | A1 | 4/2003 | JP | 03018373 A | 1/1991 |
| EP | 1349644 | B1 | 10/2003 | JP | 03028797 A | 2/1991 |
| EP | 1350555 | A1 | 10/2003 | JP | 03-086529 A | 4/1991 |
| EP | 1236503 | B1 | 8/2004 | JP | 03110445 A | 5/1991 |
| EP | 1445240 | | 8/2004 | JP | 04108518 A | 4/1992 |
| EP | 1466658 | A1 | 10/2004 | JP | 04110023 A | 4/1992 |
| EP | 1659171 | A1 | 5/2006 | JP | 4-190889 A | 7/1992 |
| EP | 1420874 | B1 | 1/2011 | JP | 04187224 A | 7/1992 |
| FR | 2620712 | A1 | 3/1989 | JP | 4-256425 A | 9/1992 |
| FR | 2674448 | A1 | 10/1992 | JP | 04250898 A | 9/1992 |
| FR | 2699424 | A1 | 6/1994 | JP | 04256424 A | 9/1992 |
| FR | 2762834 | A1 | 11/1998 | JP | 04265128 A | 9/1992 |
| GB | 702911 | A | 1/1954 | JP | 04293527 A | 10/1992 |
| GB | 996195 | A | 6/1965 | JP | 04310223 A | 11/1992 |
| GB | 2253572 | A | 9/1992 | JP | 04317793 A | 11/1992 |
| JP | 52-078677 | A | 7/1977 | JP | 04334530 A | 11/1992 |
| JP | 53-5077 | | 1/1978 | JP | 04348252 A | 12/1992 |
| JP | 53108882 | A | 9/1978 | JP | 05023557 A | 2/1993 |
| JP | 54162684 | A | 12/1979 | JP | 05096136 A | 4/1993 |
| JP | 55099703 | A | 7/1980 | JP | 05137977 A | 6/1993 |
| JP | 55129107 | A | 10/1980 | JP | 05157654 A | 6/1993 |
| JP | 55129155 | A | 10/1980 | JP | 05161831 A | 6/1993 |
| JP | 56021604 | A | 2/1981 | JP | 05279447 A | 10/1993 |
| JP | 56118701 | A | 9/1981 | JP | 05285348 A | 11/1993 |
| JP | 56121685 | A | 9/1981 | JP | 05305221 A | 11/1993 |
| JP | 57190697 | A | 11/1982 | JP | 06-027215 A | 2/1994 |
| JP | 58088007 | A | 5/1983 | JP | 06071120 A | 3/1994 |
| JP | 60019002 | A | 1/1985 | JP | 06114240 A | 4/1994 |
| JP | 60-206412 | A | 10/1985 | JP | 06170364 A | 6/1994 |
| JP | 60260628 | A | 12/1985 | JP | 06218237 A | 8/1994 |
| JP | 61097005 | A | 5/1986 | JP | 06-292820 A | 10/1994 |
| JP | 61097006 | A | 5/1986 | JP | 06277469 A | 10/1994 |
| JP | 61107905 | A | 5/1986 | JP | 06285496 A | 10/1994 |
| JP | 61167406 | A | 7/1986 | JP | 06343837 A | 12/1994 |
| JP | 61167407 | A | 7/1986 | JP | 07000770 A | 1/1995 |
| JP | 61171504 | A | 8/1986 | JP | 07024272 A | 1/1995 |
| JP | 61192309 | A | 8/1986 | JP | 07047247 A | 2/1995 |
| JP | 61222510 | A | 10/1986 | JP | 07068139 A | 3/1995 |
| JP | 61242607 | A | 10/1986 | JP | 07136470 A | 5/1995 |
| JP | 61249505 | A | 11/1986 | JP | 07136471 A | 5/1995 |
| JP | 61257203 | A | 11/1986 | JP | 07155564 A | 6/1995 |
| JP | 61263605 | A | 11/1986 | JP | 07155758 A | 6/1995 |
| JP | 61291007 | A | 12/1986 | JP | 7-39921 | 7/1995 |
| JP | 61293504 | A | 12/1986 | JP | 07178323 A | 7/1995 |
| JP | 62004408 | A | 1/1987 | JP | 07185268 A | 7/1995 |
| JP | 62068828 | A | 3/1987 | JP | 07185270 A | 7/1995 |
| JP | 62114609 | A | 5/1987 | JP | 07185271 A | 7/1995 |

| | | | | | | |
|---|---|---|---|---|---|---|
| JP | 07185272 | A | 7/1995 | JP | 2001120963 A | 5/2001 |
| JP | 07236819 | A | 9/1995 | JP | 2001-510396 T | 7/2001 |
| JP | 07-256253 | | 10/1995 | JP | 2001179059 A | 7/2001 |
| JP | 07251043 | A | 10/1995 | JP | 2001179060 A | 7/2001 |
| JP | 07275665 | A | 10/1995 | JP | 2001190937 A | 7/2001 |
| JP | 07289860 | A | 11/1995 | JP | 2001190938 A | 7/2001 |
| JP | 07303895 | A | 11/1995 | JP | 2001205055 A | 7/2001 |
| JP | 07313973 | A | 12/1995 | JP | 2001-269546 | 10/2001 |
| JP | 08010585 | A | 1/1996 | JP | 2002177746 A | 6/2002 |
| JP | 8039089 | A | 2/1996 | JP | 3302992 B2 | 7/2002 |
| JP | 08-197053 | | 8/1996 | JP | 2002-527229 A | 8/2002 |
| JP | 08323161 | A | 12/1996 | JP | 2002525197 T | 8/2002 |
| JP | 08332357 | A | 12/1996 | JP | 2002263407 A | 9/2002 |
| JP | 09000890 | A | 1/1997 | JP | 2002-336663 | 11/2002 |
| JP | 09038470 | A | 2/1997 | JP | 2003024751 | 1/2003 |
| JP | 09-075689 | A | 3/1997 | JP | 2003047830 A | 2/2003 |
| JP | 09072993 | A | 3/1997 | JP | 2003053157 A | 2/2003 |
| JP | 09099227 | A | 4/1997 | JP | 2003053160 A | 2/2003 |
| JP | 9103661 | A | 4/1997 | JP | 200371254 A | 3/2003 |
| JP | 9138298 | A | 5/1997 | JP | 2003062436 A | 3/2003 |
| JP | 09141063 | A | 6/1997 | JP | 2003135935 A | 5/2003 |
| JP | 09155345 | A | 6/1997 | JP | 2003190976 A | 7/2003 |
| JP | 09187628 | A | 7/1997 | JP | 2003-265597 | 9/2003 |
| JP | 09192458 | A | 7/1997 | JP | 2003-275548 A | 9/2003 |
| JP | 09220569 | A | 8/1997 | JP | 2003266072 A | 9/2003 |
| JP | 09271641 | A | 10/1997 | JP | 2003275759 A | 9/2003 |
| JP | 09-313902 | A | 12/1997 | JP | 2003340250 A | 12/2003 |
| JP | 09324067 | A | 12/1997 | JP | 2004-008981 | 1/2004 |
| JP | 10-015365 | A | 1/1998 | JP | 2004-230287 A | 8/2004 |
| JP | 10024222 | A | 1/1998 | JP | 2004230280 A | 8/2004 |
| JP | 10033955 | A | 2/1998 | JP | 2004322100 A | 11/2004 |
| JP | 10048466 | A | 2/1998 | JP | 2004337730 A | 12/2004 |
| JP | 10076144 | A | 3/1998 | JP | 2005-087887 A | 4/2005 |
| JP | 10076264 | A | 3/1998 | JP | 2005144291 A | 6/2005 |
| JP | 10085562 | A | 4/1998 | JP | 2005154551 A | 6/2005 |
| JP | 10085565 | A | 4/1998 | JP | 2005279447 A | 10/2005 |
| JP | 10085566 | A | 4/1998 | JP | 2006-116495 | 5/2006 |
| JP | 10156149 | A | 6/1998 | JP | 2007-547083 | 8/2010 |
| JP | 10180048 | A | 7/1998 | JP | 4833353 B2 | 12/2011 |
| JP | 10225685 | A | 8/1998 | KR | 20-0232145 | 7/2001 |
| JP | 10235168 | A | 9/1998 | KR | 1020020067227 | 8/2002 |
| JP | 10286441 | A | 10/1998 | KR | 20-0295350 | 11/2002 |
| JP | 10328538 | A | 12/1998 | KR | 2002-0090967 | 12/2002 |
| JP | 11005023 | A | 1/1999 | KR | 2003-033812 | 5/2003 |
| JP | 11028467 | A | 2/1999 | KR | 2003-060625 | 7/2003 |
| JP | 11031025 | A | 2/1999 | KR | 2005-063478 | 6/2005 |
| JP | 11033365 | A | 2/1999 | NL | 1020491 C | 10/2003 |
| JP | 11033367 | A | 2/1999 | NL | 1021197 C | 10/2003 |
| JP | 11076769 | A | 3/1999 | NZ | 510394 A | 5/2003 |
| JP | 11156166 | A | 6/1999 | NZ | 537874 A | 2/2007 |
| JP | 11156360 | A | 6/1999 | TW | 347343 | 12/1998 |
| JP | 11165200 | A | 6/1999 | WO | 8800494 A1 | 1/1988 |
| JP | 11-179171 | A | 7/1999 | WO | 8801529 A1 | 3/1988 |
| JP | 11-309351 | A | 11/1999 | WO | 8801895 A1 | 3/1988 |
| JP | 11302438 | A | 11/1999 | WO | 8806200 A1 | 8/1988 |
| JP | 11319501 | A | 11/1999 | WO | 8900880 A1 | 2/1989 |
| JP | 11319507 | A | 11/1999 | WO | 9000434 A1 | 1/1990 |
| JP | 11333265 | A | 12/1999 | WO | 9104783 A1 | 4/1991 |
| JP | 2000000439 | A | 1/2000 | WO | 9116124 A1 | 10/1991 |
| JP | 2000051669 | A | 2/2000 | WO | 9302779 A1 | 2/1993 |
| JP | 2000061466 | A | 2/2000 | WO | 9315827 A1 | 8/1993 |
| JP | 200079390 | A | 3/2000 | WO | 93223152 A1 | 11/1993 |
| JP | 2000070684 | A | 3/2000 | WO | 9411094 A1 | 5/1994 |
| JP | 2000-093758 | | 4/2000 | WO | 9534424 A1 | 12/1995 |
| JP | 2000-157845 | | 6/2000 | WO | 9603202 A1 | 2/1996 |
| JP | 2000157850 | A | 6/2000 | WO | 9607470 A1 | 3/1996 |
| JP | 2000185220 | A | 7/2000 | WO | 9628236 A1 | 9/1996 |
| JP | 2000189958 | A | 7/2000 | WO | 9629142 A1 | 9/1996 |
| JP | 2000233020 | A | 8/2000 | WO | 9641676 A1 | 12/1996 |
| JP | 2000237548 | A | 9/2000 | WO | 9706880 A2 | 2/1997 |
| JP | 2000300968 | A | 10/2000 | WO | 9822204 A1 | 5/1998 |
| JP | 2000317276 | A | 11/2000 | WO | 9825694 A1 | 6/1998 |
| JP | 2000-334276 | A | 12/2000 | WO | 9828066 A1 | 7/1998 |
| JP | 2000342932 | A | 12/2000 | WO | 9853902 A1 | 12/1998 |
| JP | 2001009246 | A | 1/2001 | WO | 9901207 A1 | 1/1999 |
| JP | 2001070967 | A | 3/2001 | WO | 99-55448 A1 | 11/1999 |
| JP | 2001079366 | A | 3/2001 | WO | 9959707 A1 | 11/1999 |
| JP | 2001079367 | A | 3/2001 | WO | 0018498 A1 | 4/2000 |
| JP | 2001104760 | A | 4/2001 | WO | 0030742 A1 | 6/2000 |

| | | | |
|---|---|---|---|
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0226363 A2 | 4/2002 |
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008034570 A1 | 3/2008 |
| WO | 2008153818 A1 | 12/2008 |
| WO | 2009030405 A1 | 3/2009 |

OTHER PUBLICATIONS

Almulla et al., "Developments in high recovery brackish water desalination plants as part of the solution to water quantity problems," Desalination, 153 (2002), pp. 237-243.

Anonymous, "Nonwoven Constructions of Dyneon "THV and Dyneon "The Fluorothermoplastics", Research Disclosure Journal, Apr. 1999, RD 420013, 2 pages.

Cote et al. "A New Immersed Membrane for Pretreatment to Reverse Osmosis," Desalination, 139 (2001), pp. 229-236.

Cote et al., "Immersed Membranes Activated Sludge Process Applied to the Treatment of Municipal Wastewater," Wat. Sci. Tech. 38(4-5) (1998), pp. 437-442.

Crawford et al., "Procurement of Membrane Equipment: Differences Between Water Treatment and Membrane Bioreactor (MBR) Applications" (2003).

Cui et al., "Airlift crossflow membrane filtration—A feasibility study with dextran ultrafiltration," J. Membrane Sci. (1997) vol. 128, pp. 83-91.

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent et al., "Neural networks for long term prediction of fouling and backwash efficiency in ultrafiltration for drinking water production," Desalination 131 (2000) pp. 353-362.

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Jones, Craig, "Applications of Hydrogen Peroxide and Derivatives," The Royal Society of Chemistry, Cambridge, UK 1999 Chapters 2 and 5.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system" Water Research, 37(5) Mar. 2003, pp. 1192-1197, Elsevier, Amsterdam, NL.

Lloyd, D.R. et al. "Microporous Membrane Formation Via Thermally Induced Phase Separation/Solid-Liquid Phase Separation" Journal of Membrane Science, 52(3) (1990) pp. 239-261, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic" Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007 filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwm-mrw.interscience.wiley.com/eow/.

Webster's Ninth New Collegiate Dictionary, Merriam-Webster Inc., Publishers, Springfield, Massachusetts, USA, Copyright 1986, p. 1298.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., "Direct Solid-Liquid Separation Using Hollow Fiber Membrane in an Activated Sludge Aeration Tank," Water Science Technology, 21 (1989) pp. 43-54.

Yoon: "Important operational parameters of membrane bioreactor-sludge disintegration (MBR-SD) system for zero excess sludge production" Water Research, 37 (2003) pp. 1921-1931, Elsevier, Amsterdam, NL.

Zenon, "Proposal for ZeeWeed® Membrane Filtration Equipment System for the City of Westminster, Colorado, Proposal No. 479-99," Mar. 2000, entire publication.

PCT Search Report for International Application No. PCT/US2007/22493 dated Apr. 21, 2008.

PCT Patentability Report for International Application No. PCT/US2007/22493 dated May 7, 2009.

* cited by examiner

INFILTRATION/INFLOW CONTROL FOR MEMBRANE BIOREACTOR

CROSS REFERENCE TO RELATED APPLICATION AND PRIORITY CLAIM

This application is a U.S. national stage application and claims the benefit under 35U.S.C. §371 of International Application No. PCT/US2007/022493 filed on Oct.23, 2007, entitled INFILTRATION/INFLOW CONTROL FOR MEMBRANE BIOREACTOR, which claims the benefit under 35U.S.C. §119(e) of copending U.S. Provisional Application Ser. No.60/862,626, entitled INFILTRATION/INFLOW CONTROL FORMEMBRANE BIOREACTOR filed on Oct.24, 2006, each of which is hereby incorporated by reference in their entirety and to which this application claims the benefit of priority.

BACKGROUND OF INVENTION

1. Field of Invention

The present invention relates to a system and method for treating wastewater, and more particularly to a wastewater treatment system and method utilizing a membrane bioreactor.

2. Discussion of Related Art

The importance of membrane for treatment of waste water is growing rapidly. With the arrival of submerged membrane processes where membrane modules are immersed in a large feed tank and filtrate is collected typically through suction applied to the filtrate side of the membrane, membrane bioreactors (MBRs) combining biological and physical processes in one stage promise to be more compact, efficient and economic. Membrane bioreactors are typically sized to accommodate community and large-scale sewage treatment. A need has been found for these systems to periodically handle large flows of influent caused by peak rain events during storms and the like.

SUMMARY OF INVENTION

In accordance with one or more embodiments, the invention relates to a system and method of treating wastewater.

In one embodiment, a wastewater treatment system includes a first treatment zone fluidly connected to one or more further treatment zones. A membrane module comprising a filter membrane is positioned in or fluidly connected to the further treatment zone. A gravity settling device is fluidly connected to the first treatment zone to receive overflow therefrom.

Another embodiment is directed to a method of treating wastewater which includes flowing a wastewater through one or more treatment zones to produce a fluid product which is passed through a filter membrane to produce a concentrated mixed liquor and a filtrate, returning at least a portion of the concentrated mixed liquor to at least one of said treatment zones, when the flow of wastewater water exceeds a predetermined level, flowing a portion of said returned mixed liquor to a gravity settling device and clarifying the mixed liquor within the gravity settling device.

Preferably, the process may use multiple reactors in series, with the ability to maintain different food to micro-organism ratios and different dissolved oxygen concentrations in each reactor. For preference, the sludge separated from the mixed liquor in the gravity settling device is returned to a reactor downstream of the reactor feeding the gravity settling device.

BRIEF DESCRIPTION OF DRAWINGS

A preferred embodiment of the invention will now be described, by way of example only, with reference to the accompanying drawing in which.

Figure 1:
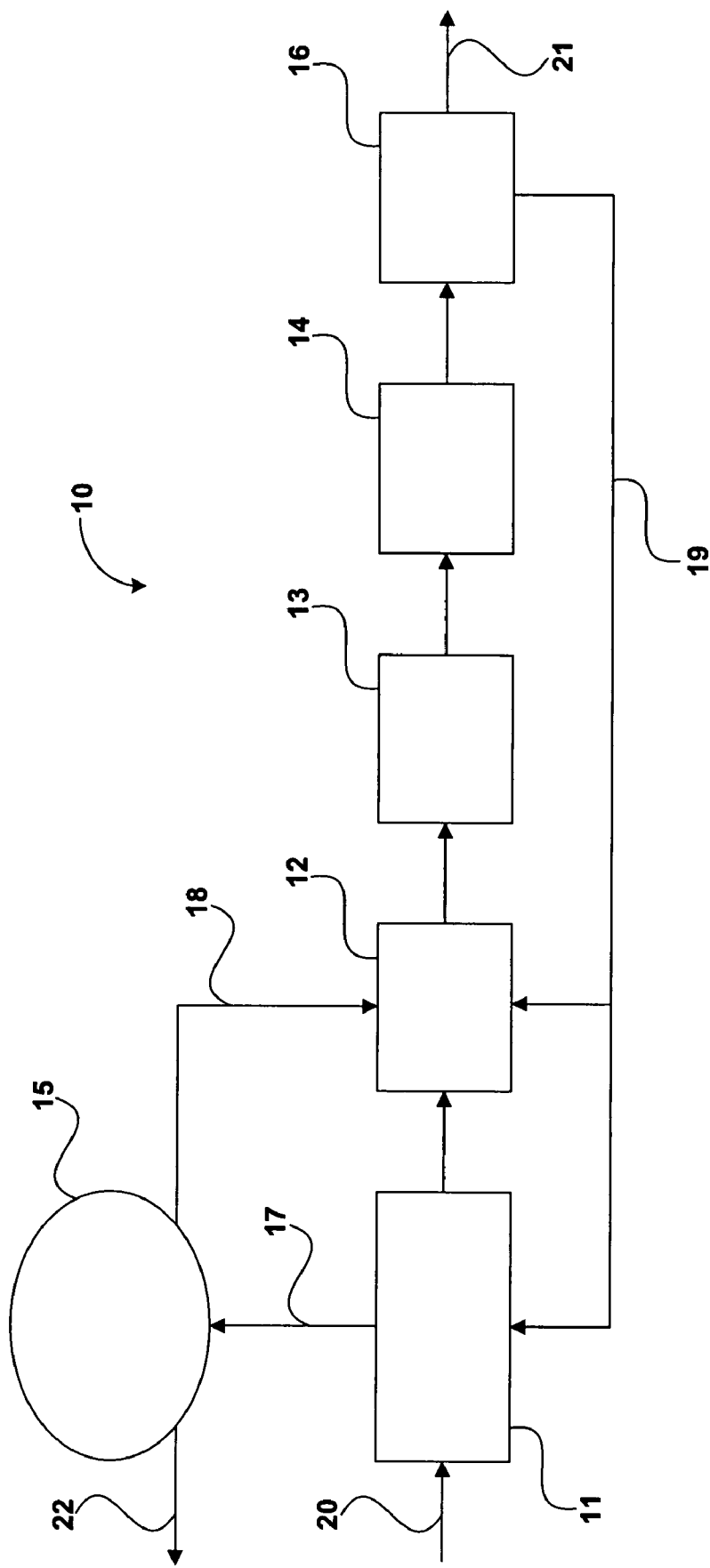
FIG. 1 illustrates a system in accordance with one embodiment of the invention.

The accompanying drawings are not intended to be drawn to scale.

DETAILED DESCRIPTION

This invention is not limited in its application to the details of construction and the arrangement of components set forth in the following description or illustrated in the drawing. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

This invention may be directed to wastewater treatment systems utilizing membrane bioreactors designed to treat wastewater flows as low as 25,000 gallons per day, or peak flows as high as about 100 million gallons per day (MGD) or greater. In one embodiment the wastewater treatment system is designed to treat an average flow of 12 MGD and a peak wastewater flow of about 30 MGD. It will be appreciated these flow volumes are merely exemplary and in no way intended to restrict the application of the invention which may be applied over a much wider range of flow.

"Wastewater," as used herein, defines a stream of waste from a residential or community source, having pollutants of biodegradable material, inorganic or organic compounds capable of being decomposed by bacteria, flowing into the wastewater treatment system. As used herein, a "wastewater treatment system" is a system, typically a biological treatment system, having a biomass population of bacterial microorganisms of a diversity of types of bacteria, used to digest biodegradable material. Notably, the biomass requires an environment that provides the proper conditions for growth.

One embodiment of the present invention includes bioreactor having one or more treatment zones. As used herein, the phrase "treatment zone" is used to denote an individual treatment region. Individual treatment regions may be housed in a single vessel with one or more compartments. Alternatively, individual treatment regions may be housed in separate vessels, wherein a different treatment is carried out in separate vessels. The treatment zone, i.e. the vessel or compartment, may be sized and shaped according to a desired application and volume of wastewater to be treated.

The wastewater treatment system may include a fluidizable media housed in a first treatment zone. The fluidizable media may comprise biomass carriers designed to immobilize anoxic organisms. The biomass carriers may be formed of any material suitable to support organisms and to remain fluidized under operating conditions. In one embodiment, the fluidizable media has a specific gravity substantially the same as that of water. In another embodiment the fluidizable media has a surface area adequate to allow denitrifying bacteria to grow, which may enhance the efficiency of the anoxic reaction to remove nitrogen.

Any volume of fluidizable media may be utilized within the first treatment zone for a particular purpose. For example, a maximum volume of fluidized media may be used to substantially fill the first treatment zone, or a lesser volume of fluidized material may be used to fill a portion of the first treatment zone.

According to one embodiment of the invention, one or more porous or permeable membranes may be used to treat fluid flow from treatment zones and in some embodiments may be positioned within a treatment zone. The membrane may have any configuration suitable for a particular purpose, such as sheet or hollow tube. The membrane may be formed of any material (natural or synthetic) suitable for a particular filtration process. In one embodiment, the membrane is formed of polymeric hollow fibers.

One or more membranes may be positioned in one or more membrane modules. The membrane modules may have any shape and cross sectional area suitable for use in a desired application, for example, square, rectangular, or cylindrical. In one embodiment, the membrane modules are rectangular.

According to one embodiment, one or more membrane modules may be positioned in a treatment zone in such a way as to be completely submerged by fluid during operation. For example, the membrane module may be positioned vertically, horizontally, or at an angle within the second treatment zone. Multiple membrane modules may be positioned adjacent one another, or located at predetermined positions within the second treatment zone and may, but need not, be positioned in the same plane as others or parallel to one another. In one embodiment, hollow fiber membranes may be positioned horizontally within the treatment zone. One or more membrane modules may be mounted directly to the vessel or compartment which forms a treatment zone. Alternatively, one or more membrane modules may be mounted to a module support which may be removably attached to the vessel or compartment forming the treatment zone. In one embodiment, a plurality of membrane modules are mounted to a module support rack to facilitate membrane maintenance and/or replacement. In another embodiment, membrane modules having vertical partitions may be positioned horizontally.

The treatment zone may include an aeration system to suspend solids in wastewater or resultant concentrated mixed liquor contained within the second treatment zone, and/or to assist water transfer through the membrane. The aeration system may produce fine bubbles, coarse bubbles, a jet stream of gas, a jet of gas and fluid, and combinations thereof. The aeration system may be positioned in any suitable location within the treatment zone. In one embodiment, aeration may be provided along a length of one or more membrane modules horizontally positioned.

According to another embodiment, the wastewater treatment system may include one or more pretreatment units, such as to collect solids and/or to remove phosphorous. In one embodiment the pretreatment unit is a trap to remove floating solids, such as grease, and other gross organic solids until they become more soluble, and is positioned upstream of the first treatment zone. The trap may be sized to provide a volume of about 1×FF (1 forward feed). In another embodiment, the pretreatment unit is a chemical phosphorous removal unit.

According to another embodiment, the wastewater treatment system may further include an equalization tank and/or a reserve storage tank fluidly connected to the bioreactor. The tank may be sized to accommodate fluctuations in wastewater generation to normalize flow into the bioreactor. For example, the equalization capacity may be equal to about 8 hours or about 33% of the FF. The same tank may also be sized to provide reserve capacity for an emergency such as a power failure, and may have a reserve capacity of about 16 hours or about 67% of the FF. In one embodiment, the tank is sized to provide a volume of about 1×FF to provide for equalization and a reserve.

Referring to the FIG. 1 there is illustrated one embodiment of the present wastewater treatment system. The figure shows a bioreactor 10 comprising a number of treatment tanks 11 to 14 connected in series with the same or different environments maintained in each tank and a membrane filter 16 connected thereto. The tanks are fluidly coupled in series to each other. Possible environments in the tanks could include anaerobic, anoxic, aerated anoxic, or aerobic depending on the effluent water quality requirements for each specific application. A clarifier 15 is fluidly connected to tanks 11 and 12 by fluid inflow line 17 and fluid outflow line 18. A fluid feedback line 19 is provided from the feed side of the membrane filter 16 to tanks 11 and 12. Wastewater is fed into the bioreactor 10 through influent line 20. Effluent is withdrawn from the bioreactor 10 through effluent line 21 coupled to the filtrate side of the membrane filter 16. Clarifier effluent is flowed from the clarifier 15 through clarifier effluent line 22.

In one mode of operation, during average inflow conditions, the inflow to tank 11 is the average design flow rate Q and all flow is directed through the treatment tanks to the membrane filter 16. A portion of the mixed liquor, typically a flow equal to around 2 to 8 times the average design flow, Q, is returned to treatment tank 11. In this mode of operation no overflow is provided to clarifier 15 from tank 11 and there is no feedback of mixed liquor to tank 12.

In a second mode of operation, during wet weather or high inflow conditions, a portion of the mixed liquor flow (typically a flow equal to around 1 to 4 times the average design flow, Q) into tank 11 is diverted to the clarifier 15 through inflow line 17 with the remainder flowing from tank 11 to tank 12. The mixed liquor feedback from the membrane filter 16 to tank 11 is also reduced (typically to about 0.5 to 2 times the average design flow, Q) by diverting a portion of the flow to tank 12. The flow from tank 11 into the clarifier 15 is selected to allow reliable gravity settling of solids material within the clarifier 15.

Activated sludge is returned from the clarifier 15 through outflow line 18 to tank 12 (typically a flow equal to about 0.25 to 1 times the average design flow, Q). Clarified effluent is withdrawn from the clarifier 15 through clarifier effluent line 22.

Figure 2:
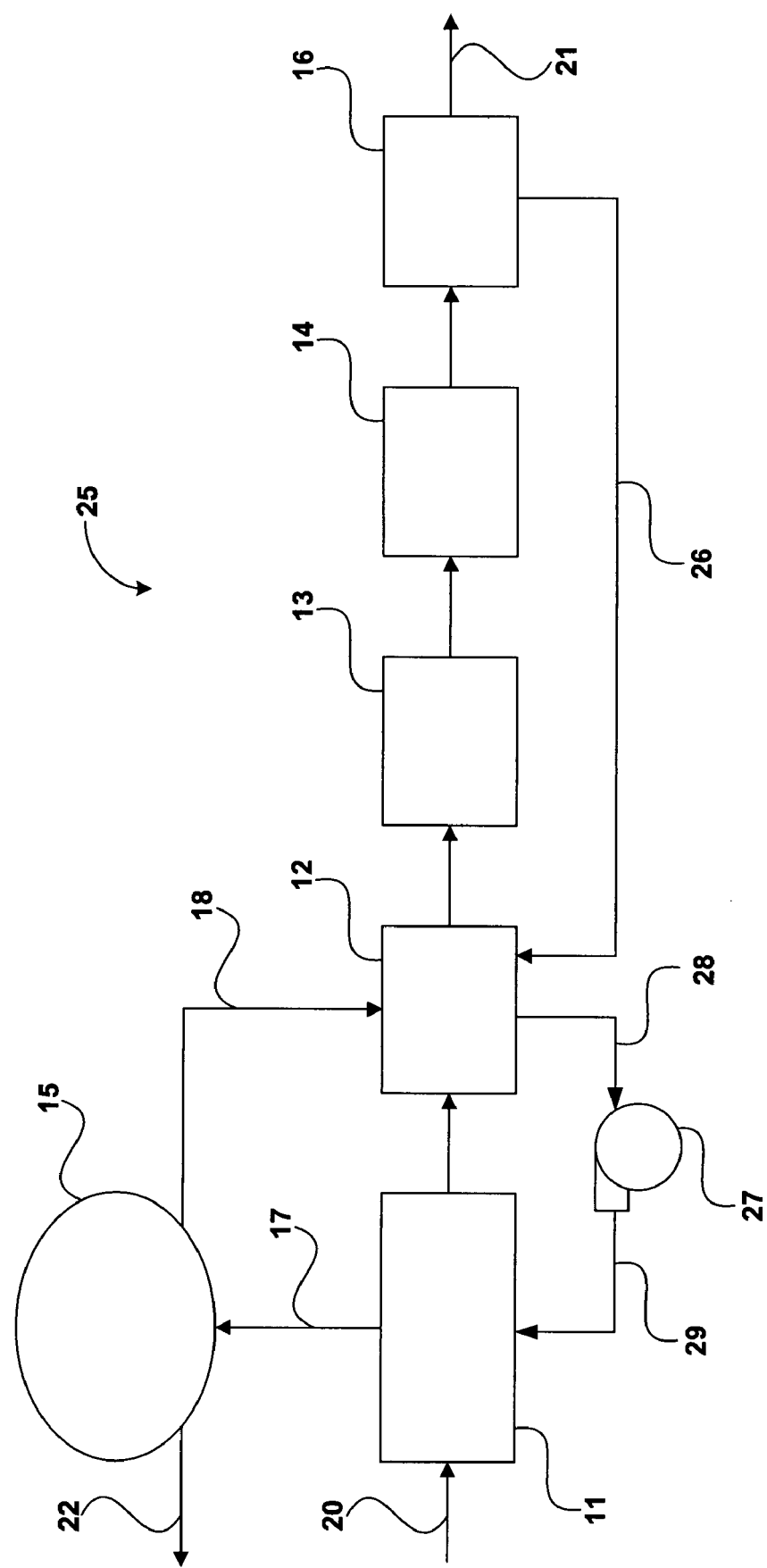
FIG. 2 illustrates a system in accordance with another embodiment of the invention.

Referring to FIG. 2 by way of example only, there is illustrated another embodiment of the present wastewater treatment system in the form of a bioreactor 25. It will be appreciated that this embodiment functions similarly to the embodiment disclosed in FIG. 1, although a fluid feedback line 26 is now provided from the feed side of the membrane filter 16 to tank 12 and a pump 27 with associated feedback lines 28 and 29 interconnecting tanks 11 and 12 for providing feedback therebetween. In this embodiment the speed of the pump can control the rate of feedback from treatment tank 12 to treatment tank 1, and is used to control the concentration of mixed liquor in tank 11 such that reliable gravity settling of solids material within the clarifier 15 can be achieved. It will be appreciated that, referring FIG. 1, this is an alternative to splitting the fluid feedback line 19 between reactors 11 and 12.

It is often advantageous to include a means of automated control. By way of example, an automated control process can include:

1) Splitting Effluent flow from one or more initial treatment tanks, whereby part of the flow is diverted to the clarifiers 18 and the remainder is treated by the membrane filter 16.
2) Splitting feedback flow provided from the feed side of the membrane filter 16, whereby part of the flow is diverted to upstream treatment tanks that feed the clarifiers 15 and the remainder is sent to downstream treatment tanks that flow to the membrane filter 16.

In an embodiment, by way of example only, effluent flow from one or more initial treatment tanks is split, whereby part of the flow is diverted to the clarifiers 18 and the remainder is treated by a membrane filter 16. It will be appreciated that the flow to the membranes is typically controlled by pumps, and is based on the liquid level in the furthest upstream treatment tank. It will be further appreciated that flow to the clarifiers can be regulated by a weir in the furthest upstream treatment tank. In this example, if the influent flow rate exceeds the rate that the membranes can handle, the liquid level in the treatment tank will rise and liquid will start to flow over the weir and travel to the clarifiers. The weir can be a fixed weir. Preferably the weir is either manually adjustable, or automatically adjustable based on an influent flow meter signal or other process measurement. It will be further appreciated that, in another embodiments, the flow split between the clarifiers and the membranes can be regulated using valves, gates, or other suitable devices known to a person skilled in the art.

In another embodiment, flow to the membrane tanks is caused by gravity and a return stream back to the treatment tanks uses a pump. This embodiment requires a means for restricting the flow to the membrane tanks and thereby to back the liquid up into the upstream treatment tanks where it can be directed to the clarifiers. It would be appreciated that a means for restricting the flow to the membrane tanks can include an adjustable weir, gate, valve or other suitable devices known to a person skilled in the art.

In an embodiment, by way of example, feedback flow provided from the feed side of the membrane filter 16 is split whereby part of the flow is diverted to upstream treatment tanks that feed the clarifiers 15 and the remainder is sent to downstream treatment tanks that flow to the membrane filter 16. For example, influent flow rate and the flow rate being treated by the membranes can be measured, and the proportion of the total flow being treated by the clarifiers can be calculated. By way of example, the desired percentage of the fluid feedback provided from the feed side of the membrane filter to be sent to the clarifiers can be calculated by a programmable logic controller (PLC) using a mass balance equation. For example, this flow split can be calculated for substantially maintaining a target MLSS concentration in the stream being sent to the clarifiers. It would be appreciated that the mass balance equation can be a function of at least four variables, being the average TSS concentration in the mixed liquor (user input or as measured with TSS probes), the desired target concentration in the upstream treatment tanks (which may or may not be verified with a TSS probe), the influent flow to the plant, and the percentage of that flow being treated by the final clarifiers.

Accordingly, the invention provides an efficient means of dealing with large inflows without compromising the operation of the membrane bioreactor.

Having thus described several aspects of at least one embodiment of this invention, it should be apparent to those skilled in the art that the foregoing is merely illustrative and not limiting, having been presented by way of example only. Numerous modification and other embodiments are within the scope of the invention. In particular, although many embodiments presented herein involve specific combinations of method acts or system elements, it should be understood that those acts and those elements may be combined in other ways to accomplish the same objectives.

Further, acts, elements, and features discusses only in connection with one embodiment are not intended to be excluded from a similar role in other embodiments.

It is to be appreciated that various alterations, modifications, and improvements can readily occur to those skilled in the art and that such alterations, modifications, and improvements are intended to be part of the disclosure and within the spirit and scope of the invention.

Moreover, it should also be appreciated that the invention is directed to each feature, system, subsystem, or technique described herein and any combination of two or more features, systems, subsystems, and/or method, if such features, systems, subsystems, and techniques are not mutually inconsistent, is considered to be within the scope of the invention as described.

Those skilled in the art should appreciate that the parameters and configuration described herein are exemplary and that actual parameters and/or configurations will depend on the specific application in which the systems and techniques of the invention are used. Those skilled in the art should also recognize or be able to ascertain, using no more than routing experimentation, equivalents to the specific embodiments of the invention. It is therefore to be understood that the embodiments described herein are presented by way of example only and that, within the scope of the invention described and equivalents thereto; the invention may be practice d otherwise than as specifically described.

The invention claimed is:

1. A wastewater treatment system, comprising:
   at least one biological treatment zone;
   a membrane module fluidly connected downstream of the at least one biological treatment zone;
   a gravity settling device fluidly connected to the at least one biological treatment zone;
   a feedback line fluidly connecting a feed side of the membrane module to the at least one biological treatment zone; and
   a controller configured to operate in a first mode of operation during inflow conditions that are at or below a predetermined level to direct all inflow through the at least one biological treatment zone to the membrane module, and further configured to operate in a second mode of operation during inflow conditions that exceed the predetermined value to divert at least a portion of inflow from the at least one biological treatment zone to the gravity settling device.

2. The system of claim 1, wherein the at least one biological treatment zone is at least partially filled with a fluidizable media having a specific gravity substantially the same as that of water or a surface area adequate to promote growth of denitrifying bacteria.

3. The system of claim 1, wherein the at least one biological treatment zone comprises a plurality of biological treatment zones fluidly connected in series.

4. The system of claim 3, wherein the plurality of biological treatment zones are housed in a single vessel.

5. The system of claim 3, wherein different biological environments including one or more of anaerobic, anoxic, aerated anoxic or aerobic environments are maintained in each of the plurality of biological treatment zones.

6. The system of claim 5, wherein each of the plurality of biological treatment zones is maintained at a different food-to-microorganism ratio or at different dissolved oxygen concentrations.

7. The system of claim 1, wherein the at least one biological treatment zone includes a first biological treatment zone and a second biological treatment zone, and wherein the feedback line is configured to fluidly connect the feed side of the membrane module to at least one of the first and second biological treatment zones.

8. The system of claim 7, wherein the controller is further configured in the first mode of operation to return a portion of mixed liquor from the membrane module to only the first biological treatment zone along the feedback line, and wherein the controller is further configured in the second mode of operation to return a portion of mixed liquor from the membrane module to both the first and second biological treatment zones along the feedback line.

9. The system of claim 8, wherein the controller is further configured to determine relative percentages of mixed liquor to be returned along the feedback line to the first and second biological treatment zones using a mass balance equation to substantially maintain a target mixed liquor suspended solids concentration of a stream delivered to the gravity settling device.

10. The system of claim 8, wherein the controller is further configured in the second mode of operation to discharge effluent from the gravity settling device and to return activated sludge from the gravity settling device to the second biological treatment zone.

11. The system of claim 1, wherein the at least one biological treatment zone includes a first biological treatment zone and a second biological treatment zone, and wherein the feedback line is configured to fluidly connect the feed side of the membrane module to the second biological treatment zone.

12. The system of claim 11, further comprising a second feedback line fluidly connecting the second biological treatment zone to the first biological treatment zone, and further comprising a pump configured to control a flow rate from the second biological treatment zone to the first treatment zone along the second feedback line to control a concentration level of mixed liquor within the first biological treatment zone.

13. The system of claim 7, wherein the controller is further configured to control flow to the gravity settling device in the second mode of operation based on a liquid level in the first biological treatment zone.

14. The system of claim 1, further comprising a weir, gate, valve or other device configured to restrict flow to the membrane module.

15. The system of claim 1, wherein the membrane module comprises polymeric hollow fiber membranes.

16. The system of claim 1, wherein the gravity settling device comprises a clarifier.

17. The system of claim 1, further comprising an equalization tank or a reserve storage tank fluidly connected to the at least one biological treatment zone.

18. The system of claim 1, further comprising an aeration system in cooperation with the at least one biological treatment zone or the membrane module.

19. The system of claim 1, further comprising a pretreatment unit fluidly connected upstream of the at least one biological treatment zone.

20. The system of claim 19, wherein the pretreatment unit comprises at least one of a floating solids trap and a chemical phosphorus removal unit.

* * * * *